(12) United States Patent
Ohara et al.

(10) Patent No.: US 11,432,323 B2
(45) Date of Patent: Aug. 30, 2022

(54) USER EQUIPMENT AND BASE STATION

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 2 days.

(21) Appl. No.: 16/959,547

(22) PCT Filed: Jan. 11, 2018

(86) PCT No.: PCT/JP2018/000523
§ 371 (c)(1),
(2) Date: Jul. 1, 2020

(87) PCT Pub. No.: WO2019/138513
PCT Pub. Date: Jul. 18, 2019

(65) Prior Publication Data
US 2021/0076411 A1 Mar. 11, 2021

(51) Int. Cl.
*H04W 56/00* (2009.01)
*H04W 74/00* (2009.01)
*H04W 76/27* (2018.01)
*H04W 72/04* (2009.01)
*H04W 74/08* (2009.01)

(52) U.S. Cl.
CPC ..... *H04W 74/008* (2013.01); *H04W 72/0446* (2013.01); *H04W 74/004* (2013.01); *H04W 74/0833* (2013.01); *H04W 76/27* (2018.02)

(58) Field of Classification Search
CPC ............... H04W 74/008; H04W 76/27; H04W 72/0446; H04W 74/004; H04W 74/0833
USPC .......................................................... 370/329
See application file for complete search history.

(56) References Cited

U.S. PATENT DOCUMENTS

| | | | |
|---|---|---|---|
| 2010/0182974 | A1 | 7/2010 | Barraclough et al. |
| 2014/0112286 | A1 | 4/2014 | Ahn et al. |
| 2014/0293915 | A1 | 10/2014 | Pelletier et al. |
| 2014/0307677 | A1 | 10/2014 | Yamada et al. |

(Continued)

FOREIGN PATENT DOCUMENTS

| | | |
|---|---|---|
| EP | 2613603 A2 | 7/2013 |
| JP | 2015-146633 A | 8/2015 |

(Continued)

OTHER PUBLICATIONS

International Search Report issued in PCT/JP2018/000523 dated Apr. 3, 2018 (5 pages).

(Continued)

*Primary Examiner* — Sai Ming Chan
(74) *Attorney, Agent, or Firm* — Osha Bergman Watanabe & Burton LLP

(57) ABSTRACT

Disclosed is user equipment for communicating with a base station via a radio frame. The user equipment includes a receiving unit that receives an index relating to a RACH configuration table indicating allocation of RACH resources in the radio frame from the base station; a control unit that identifies an available RACH resource based on a plurality of different RACH configuration tables and the index; and a transmitting unit that transmits a preamble to the base station using the identified available RACH resource.

5 Claims, 12 Drawing Sheets

(56) References Cited

U.S. PATENT DOCUMENTS

| | | | | |
|---|---|---|---|---|
| 2015/0078219 | A1* | 3/2015 | Li | H04W 74/004 370/278 |
| 2017/0135135 | A1* | 5/2017 | Pelletier | H04L 1/0046 |
| 2017/0231011 | A1* | 8/2017 | Park | H04W 74/006 |
| 2018/0138962 | A1* | 5/2018 | Islam | H04L 5/0032 |

FOREIGN PATENT DOCUMENTS

| | | |
|---|---|---|
| KR | 101550126 B1 | 9/2015 |
| RU | 2495547 C2 | 10/2013 |
| WO | 2017160221 A1 | 9/2017 |

OTHER PUBLICATIONS

Written Opinion of the International Searching Authority issued in PCT/JP2018/000523 dated Apr. 3, 2018 (5 pages).
Intel Corporation; "Remaining details of PRACH formats"; 3GPP TSG RAN WG1 #91, R1-1720061; Reno, USA; Nov. 27-Dec. 1, 2017 (11 pages).
NTT Docomo, Inc.; "Remaining details on PRACH formats"; 3GPP TSG RAN WG1 Meeting #91, R1-1720794; Reno, USA; Nov. 27-Dec. 1, 2017 (14 pages).
3GPP TS 36.211 V14.4.0; "3rd Generation Partnership Project; Technical Specification Group Radio Access Network; Evolved Universal Terrestrial Radio Access (E-UTRA); Physical channels and modulation (Release 14)"; Sep. 2017 (197 pages).
3GPP TS 36.213 V14.4.0; "3rd Generation Partnership Project; Technical Specification Group Radio Access Network; Evolved Universal Terrestrial Radio Access (E-UTRA); Physical layer procedures (Release 14)" Sep. 2017 (462 pages).
Notification of Reason for Refusal issued in counterpart Korean Application No. 10-2020-7018325 dated Jun. 21, 2021 (12 pages).
Office Action issued in counterpart Japanese Application No. 2019-564217 dated Sep. 7, 2021 (5 pages).
CMCC; "Discussion on RACH configuration"; 3GPP TSG RAN WG1 Meeting 90bis, R1-1717878; Prague, CZ, Oct. 9-13, 2017 (7 pages).
NTT DOCOMO, Inc.; "Remaining details on PRACH formats"; 3GPP TSG RAN WG1 Meeting #91, R1-1721044; Reno, USA, Nov. 27, 2017-Dec. 1, 2017 (21 pages).
Samsung; "Discussion on RACH configuration"; 3GPP TSG RAN WG1 Meeting #90bis, R1-1717588; Prague, CZ; Oct. 9-13, 2017 (4 pages).
Office Action iissued in counterpart New Zealand Application No. 766463, dated Jul. 16, 2021 (5 pages).
Extended European Search Report issued in counterpart European Application No. 18899103.9, dated Aug. 3, 2021 (8 pages).
Examination Report issued in Indian Application No. 202037032819 dated Aug. 27, 2021 (7 pages).
Notice of Reasons for Refusal issued in Japanese Application No. 2019-564217 dated Jan. 11, 2022 (5 pages).
Coolpad, "eIMTA impact on UL transmission" 3GPP TSG RAN WG2 Meeting #84, R2-134036, San Francisco, USA, Nov. 11-15, 2013 (5 pages).
Notification of Reason for Refusal issued in counterpart Korean Application No. 10-2020-7018325 dated Jan. 5, 2022 (8 pages).

* cited by examiner

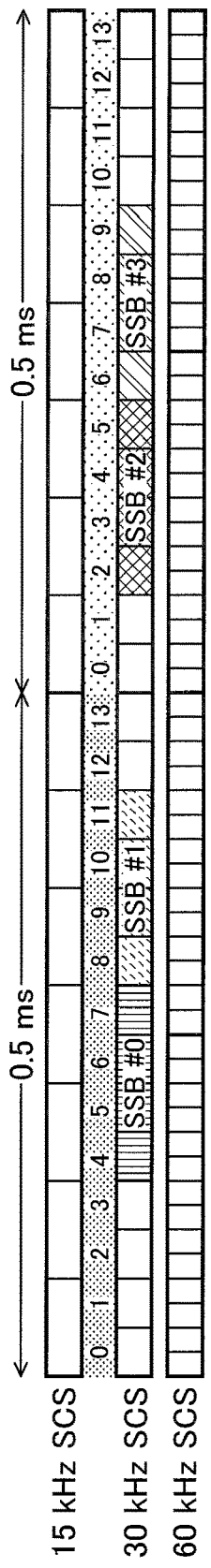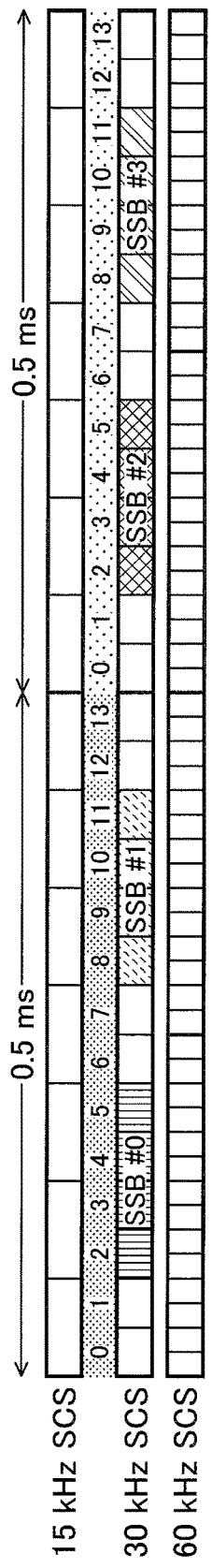
FIG.5

FIG.6
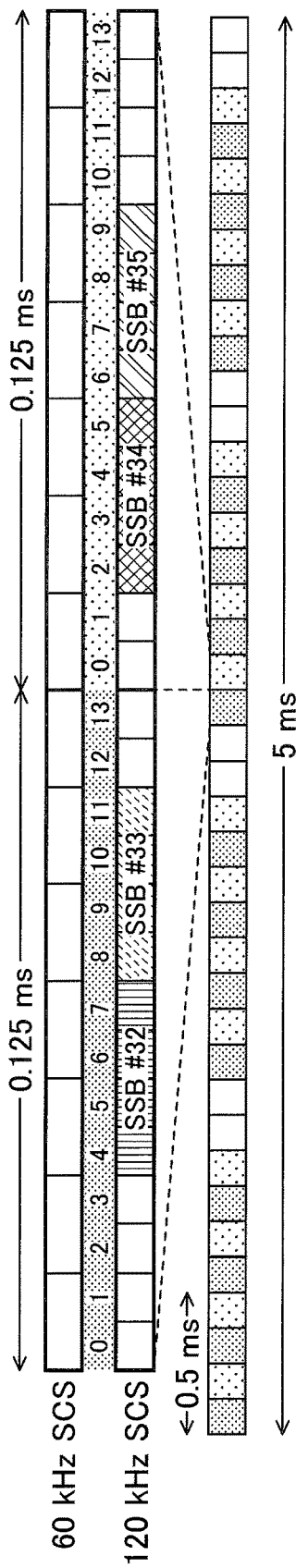
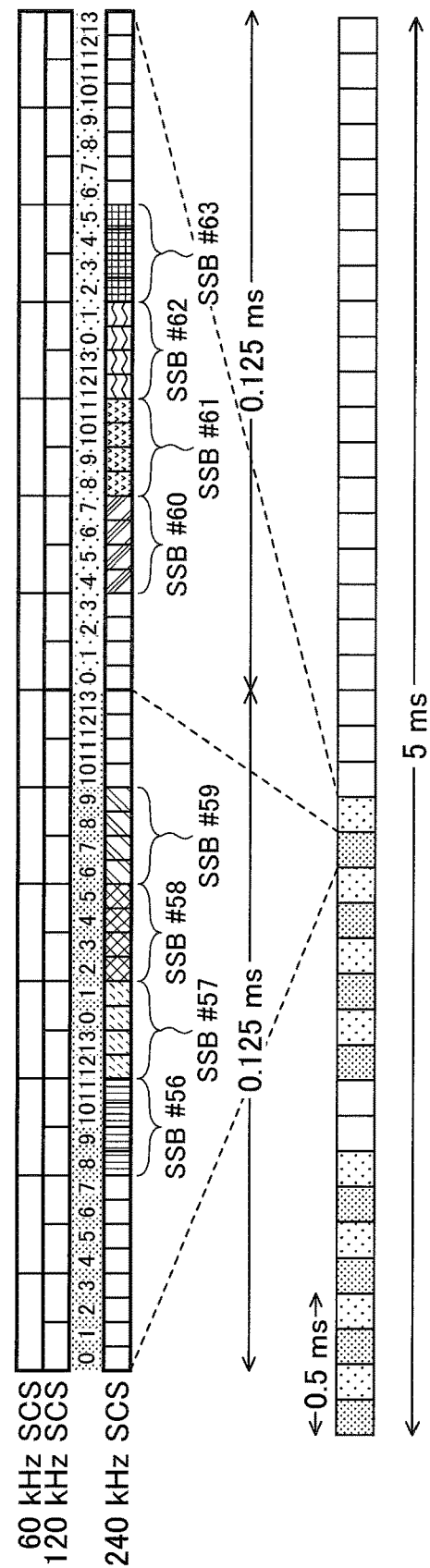

USER EQUIPMENT AND BASE STATION

TECHNICAL FIELD

The present invention relates to user equipment and a base station in a radio communication system.

BACKGROUND ART

In 3GPP (3rd Generation Partnership Project), radio communication systems called 5G or NR (New Radio) have been studied (hereinafter, the radio communication systems are referred to as "5G" or "NR") in order to achieve further larger system capacity, further faster data transmission speed, further lower latency in a radio communication section, etc. In NR, various radio technologies have been studied in order to meet requirements including latency equal to or less than 1 ms in a radio section while achieving a throughput equal to or greater than 10 Gbps.

In NR, user equipment performs cell detection and cell identification based on a synchronization signal transmitted from a base station, and acquisition of a part of system information necessary for initial access during initial access where user equipment and a base station establish a connection (e.g., Non-Patent Document 1).

Further, NR is assumed to use a wide range of frequencies ranging from a low frequency band similar to LTE (Long Term Evolution) to a frequency hand even higher than LTE. In particular, since the propagation loss increases in the high frequency band, it has been studied to apply narrow beam forming to compensate for the propagation loss (e.g., Non-Patent Document 2).

RELATED ART DOCUMENTS

Non-Patent Documents

[NON-PATENT DOCUMENT 1] 3GPP TS 36.213 V14.4.0 (2017-Sep.)
[NON-PATENT DOCUMENT 2] 3GPP TS 36.211 V14.4.0 (2017-Sep.)

SUMMARY OF THE INVENTION

Problem to be Solved by the Invention

In the NR, a portion of the synchronization signal and system information required for initial access is mapped to a radio frame with a resource unit called an SS block (Synchronization Signal block) consisting of a continuous OFDM (Orthogonal Frequency Division Multiplexing) symbol. The user equipment receives the SS block transmitted from the base station and acquires the information required for initial access. The information required for initial access includes information identifying a RACH (Random Access Channel) resource format and a preamble signal format.

In the NR, the base station also applies beam forming to transmit multiple beams. The user equipment receives the SS block associated with the beam and acquires information required for initial access. The RACH resource is associated with SS block. In addition, in the NR, DL (Downlink) or UL (Uplink) can be flexibly set to the symbol of the slot that constitutes the radio frame.

Unfortunately, since the number of indices included in the RACH configuration table for notifying the user equipment of available RACH resources is limited, it difficult to notify the user equipment 200 of the appropriate RACH resources corresponding to the number of and allocation of SS blocks in the NR, the setting of DL or UL to slots and symbols, etc.

The present invention has been made in light of the above-described points, and an object of the present invention is to efficiently notify user equipment of available resources during an initial access of a radio communication system.

Means for Solving the Problem

According to an embodiment of the present invention, user equipment for communicating with a base station via a radio frame is disclosed. The user equipment includes
a receiving unit that receives an index relating to a RACH configuration table indicating allocation of RACH resources in the radio frame from the base station;
a control unit that identifies an available RACH resource based on a plurality of different RACH configuration tables and the index; and
a transmitting unit that transmits a preamble to the base station using the identified available RACH resource.

Advantageous Effect of the Present Invention

According to the disclosed technology, in the initial access of the radio communication system, the available resources can be efficiently notified to the user equipment.

BRIEF DESCRIPTION OF THE DRAWINGS

FIG. 5 is a diagram illustrating a configuration example (2) of an SS burst set according to an embodiment of the present invention;
FIG. 6 is a diagram illustrating a configuration example (3) of an SS burst set according to an embodiment of the present invention.

EMBODIMENTS FOR CARRYING OUT THE INVENTION

Figure 1:
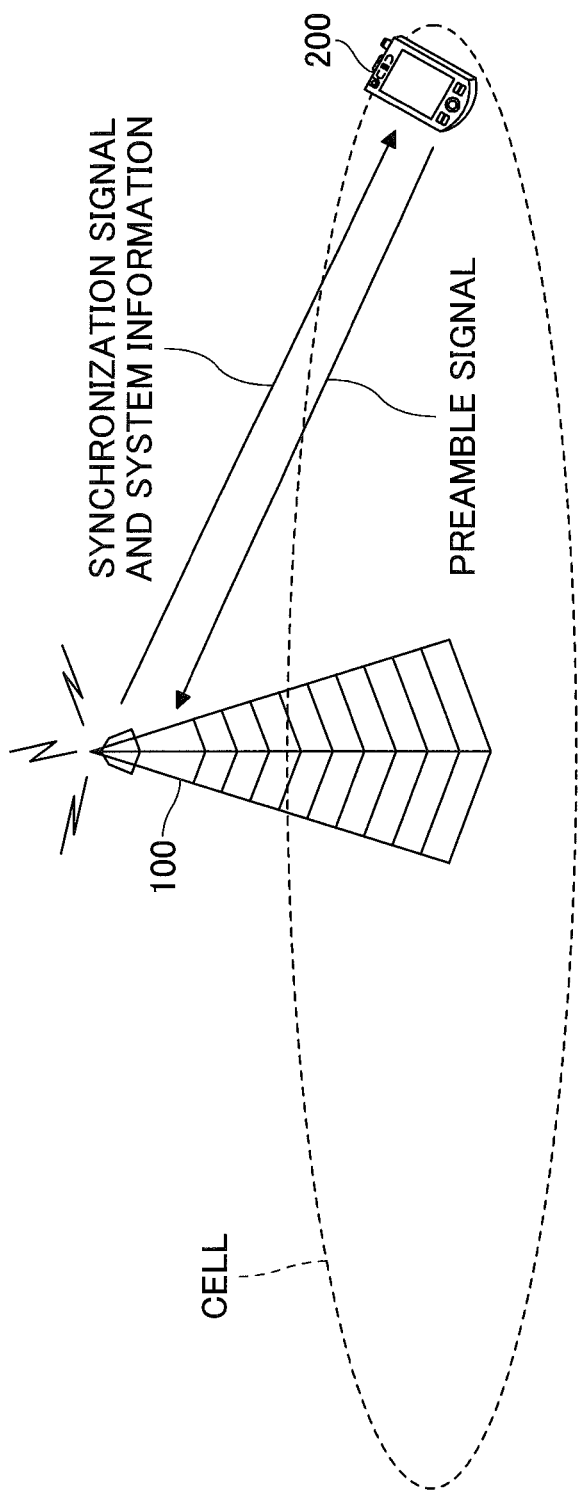
FIG. 1 is a diagram illustrating a configuration example of a radio communication system according to an embodiment of the present invention.

In the following, referring to the drawings, one or more embodiments of the present invention will be described. It should be noted that the embodiments described below are just examples. Embodiments of the present invention are not limited to the following embodiments.

In operations of a radio communication system according to an embodiment of the present invention, conventional techniques may be used if necessary. It should be noted that, although the conventional techniques are relating to the existing LTE, the conventional techniques are not limited to the existing LTE. Further, it is assumed that the term "LTE" used in the present specification has, unless otherwise specifically mentioned, a broad meaning including a scheme of LTE-Advanced and a scheme after the LTE-Advanced (e.g., NR).

Further, in the following embodiments, the terms such as SS (Synchronization Signal), PSS (Primary SS), SSS (Secondary SS), PBCH (Physical broadcast channel), PRACH (Physical RACH), etc., are used for the sake of convenience. The signals, functions, etc., similar to those above, may be referred to different terms. Further, the above-described terms used in NR will be referred to as "NR-SS", "NR-PSS", "NR-SSS", "NR-PBCH", "NR-PRACH", etc.

FIG. 1 is a diagram illustrating a configuration example of a radio communication system according to an embodiment of the present invention. The radio communication system according to an embodiment of the present invention includes a base station 100 and user equipment 200, as illustrated in FIG. 1. FIG. 1 depicts one user equipment 200 and one base station 20 each; however, this configuration of the radio communication system is merely an example. The configuration of the radio communication system may include two or more user equipment 200 and two or more base stations 100.

The base station 100 is a communication device that provides one or more cells and performs radio communication with the user equipment 200. As illustrated in FIG. 1, the base station 100 transmits synchronization signal and system information to the user equipment 200. Synchronization signals are, for example, NR-PSS and NR-SSS. System information is transmitted, for example, by NR-PBCH. System information is also called broadcast information. Both the base station 100 and the user equipment 200 can perform beam forming to transmit and receive signals. User equipment 200 is a communication device having a radio communication function such as a smartphone, a cell phone, a tablet, a wearable terminal, a communication module for Machine-to-Machine (M2M), etc., which wirelessly connects to base station 100 and utilizes various communication services provided by a radio communication system. At the initial access stage, as illustrated in FIG. 1, the user equipment 200 transmits a random access preamble signal to the base station 100. The random access is performed based on NR-PBCH system information received from the base station 100 and RMSI (Remaining minimum system information), which is system information carried onto the NR-PDSCH (Physical downlink shared channel) scheduled by the NR-PDCCH (Physical downlink control channel). RMSI includes information required for initial access, e.g., RACH settings.

In the present embodiment, the duplex scheme may be a TDD (Time Division Duplex) scheme, a FDD (Frequency Division Duplex) scheme, or other (e.g., Flexible Duplex, etc.) scheme.

In the following description, to transmit a signal using a transmission beam may be to transmit a signal multiplied by precoding vector (precoded with a precoding vector). Similarly, to receive a signal using a reception beam may be to multiply the received signal by a predetermined weight vector. Further, to transmit a signal using a transmission beam may also be expressed as to transmit a signal at a particular antenna port. Similarly, to receive a signal using a reception beam may be expressed as to receive a signal at a particular antenna port. The antenna port refers to a logical antenna port or a physical antenna port defined in the 3GPP standard. The method of forming the transmission beam and the reception beam is not limited to the above method. For example, in a base station 100 with multiple antennas and user equipment 200, a method of varying angles of each of antennas may be used; a method using a precoding vector may be combined with the method varying the angles of the antennas; a method of switching different antenna panels may be used; or different methods of combining multiple antenna panels may be used; or other methods may be used. Further, multiple mutually different transmission beams may be used in the high frequency band, for example. The use of multiple transmission beams is called a multibeam operation, and the use of a single transmission beam is called a single beam operation.

EMBODIMENTS

The following illustrates embodiments of the present invention.

Figure 2:
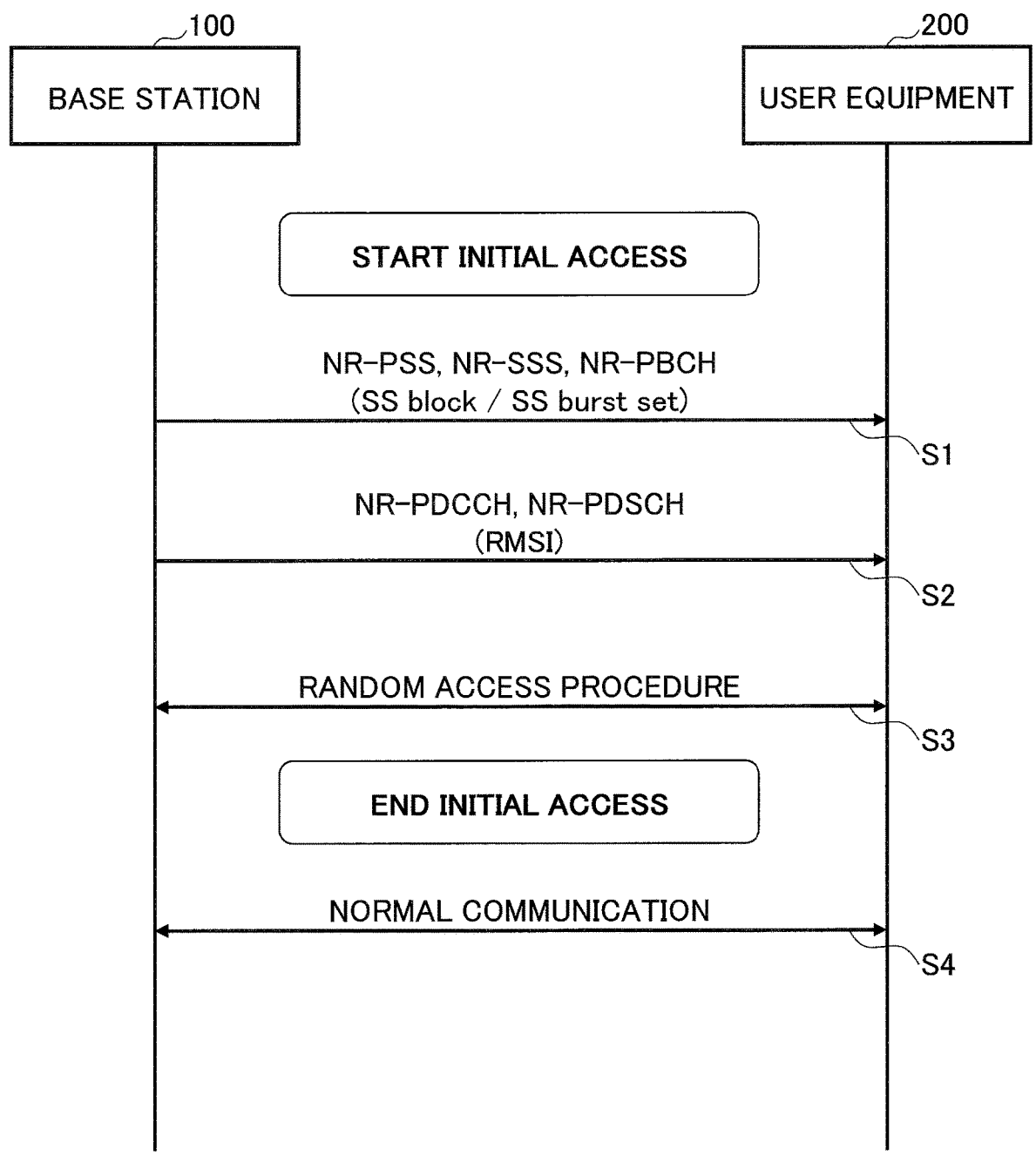
FIG. 2 is a diagram illustrating an example of a sequence of initial access according to an embodiment of the present invention.

FIG. 2 is a diagram illustrating an example of an initial access sequence in an embodiment of the present invention. When initial access is initiated, in step S1, the base station 100 transmits NR-PSS, NR-SSS, and NR-PBCH, or SS block, to the user equipment 200. NR-PBCH contains part of the system information. The base station 100 repeatedly transmits the SS burst set including multiple SS blocks to the user equipment 200 in a period of SS burst set periodicity. If the SS burst set contains multiple SS blocks, multiple SS blocks may be associated with different beams in a multibeam operating environment.

The user equipment 200 receives NR-PSS transmitted from the base station 100 and uses the NR-PSS at least to identify some of the initial time and frequency synchronization, and cell identity. The user equipment 200 also receives NR-SSS transmitted from the base station 100 and uses the NR-SSS at least to identify a portion of the cell ID. In addition, the user equipment 200 receives NR-PBCH transmitted from the base station 100 and acquires information for acquiring a portion of the system information necessary for initial access, such as the system frame number (SFN: System Frame Number) and RMSI and the like of other system information.

Subsequently, in step S2, other system information including RMSI is received via NR-PDSCH scheduled by NR-PDCCH. RMSI includes information that identifies resources, such as RACH resources and preamble formats, for performing random access procedures.

When the SS burst set contains multiple SS blocks, the user equipment 200, transmits, upon acquisition of a certain SS block, a preamble and starts a random access procedure with the RACH resource associated with the SS block (S3).

In step S3, when the random access procedure between the base station 100 and the user equipment 200 is successfully performed, initial access is completed, and normal communication is initiated (S4).

Figure 3:
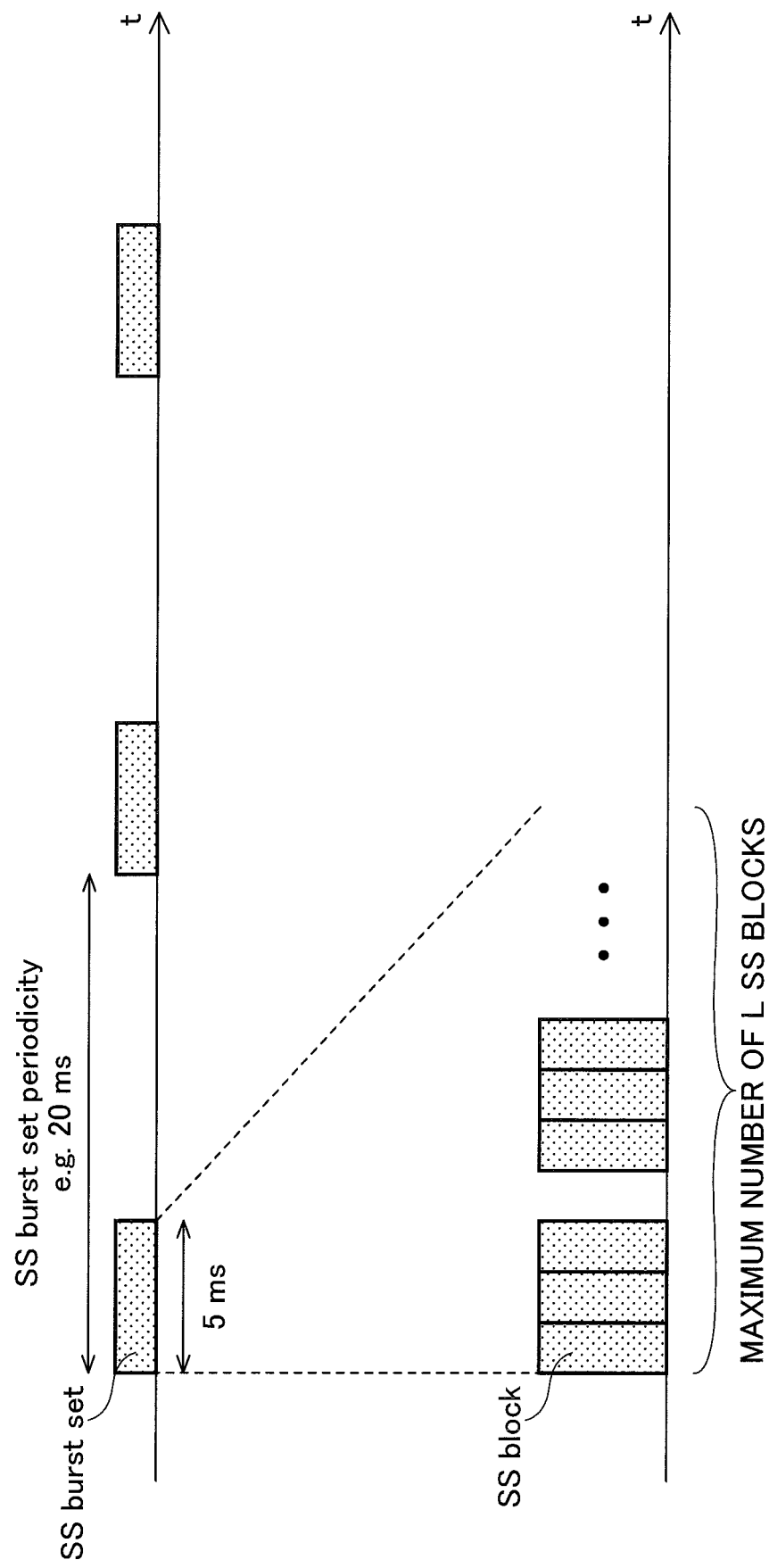
FIG. 3 is a diagram illustrating an SS burst set according to an embodiment of the present invention.

FIG. 3 is a diagram illustrating an SS burst set according to an embodiment of the present invention. As illustrated in FIG. 3, the SS burst set includes 1 to L SS blocks. Candidate resources to send SS blocks are included within a 5 ms period. Not all the SS blocks are allocated to L candidate positions in SS burst set, and L or less number of the SS blocks actually transmitted from the base station 100 is allocated according to operation. Resources at candidate positions where SS blocks are not allocated are used for normal communication. That is, L indicates the maximum number of SS blocks in the SS burst set. L also has different values according to the frequency band. For example, for frequencies below 3 GHz, L=4, for frequencies between 3 GHz and 6 GHz, L=8, and for frequencies between 6 GHz and 52.6 GHz, L=64. In the example illustrated in FIG. 3, the SS burst set periodicity indicating a period during which the SS burst set is transmitted is 20 ms. The minimum value of SS burst set periodicity may be 5 ms.

Figure 4:
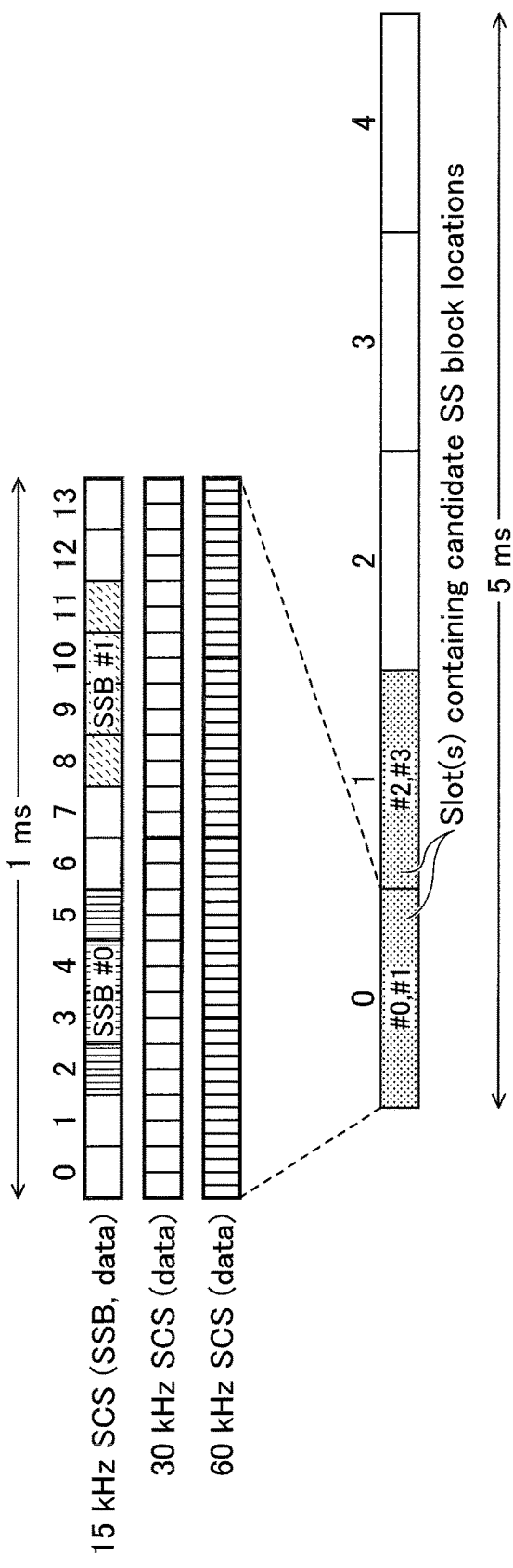
FIG. 4 is a diagram illustrating a configuration example (1) of an SS burst set according to an embodiment of the present invention.

FIG. 4 is a diagram illustrating a configuration example (1) of an SS burst set according to an embodiment of the present invention. FIG. 4 illustrates an example of an SS burst set configured in units of 5 ms or 1 ms on a radio frame.

FIG. 4(A) is an example of an SS burst set configuration where the subcarrier spacing of the radio signal to which SS block is transmitted is 15 kHz and the frequency band is up to 3 GHz. Of the five slots corresponding to 5 ms, the first two slots include an SS block (hereinafter referred to as "SSB"). SSB #0 and SSB #1 are allocated to slot #0, and SSB #2 and SSB #3 are allocated to slot #1. Slots having a length of 1 ms consist of 14 symbols #0 to #13. As illustrated in 4(A), SSB #0 is allocated from symbol #2 to symbol #5, and SSB #1 is allocated from symbol #8 to symbol #11, in a radio frame that is 15 kHz SCS (subcarrier spacing). A radio frame that is 15 kHz SCS is used to transmit and receive SSB and data, and radio frames that are 30 kHz SCS and 60 kHz SCS are used to transmit and receive data.

FIG. 4(B) is an example of an SS burst set where the subcarrier spacing of the radio signal to which SS block is transmitted is 15 kHz and the frequency band is from 3 GHz to 6 GHz. Of the five slots corresponding to 5 ms, the first four slots include an SS block. SSB #0 and #1 are allocated in the slot #0, SSB #2 and #3 are allocated in the slot #1, SSB #4 and SSB #5 are allocated in the slot #2, and SSB #6 and SSB #7 are allocated in the slot #3. The allocation of the SS blocks to the symbols in a slot may be the same as in FIG. 4(A).

FIG. 5 is a diagram illustrating a configuration example (2) of an SS burst set according to an embodiment of the present invention. FIG. 5 illustrates an example of an SS burst set configured in time units of 5 ms or 1 ms on a radio frame.

FIG. 5(A) is a configuration example of an SS burst set in slots when the subcarrier spacing of the radio signal to which SS block is transmitted is 30 kHz. SSB #0 is allocated from symbol #4 to symbol #7, and SSB #1 is allocated from symbol #8 to symbol #11 in the slot. SSB #2 is allocated from symbol #2 to symbol #5, and SSB #3 is allocated from symbol #6 to symbol #9 in the subsequent slot. SSB #0 to SSB #3 are allocated in two consecutive slots. A radio frame, which is a 30 kHz SCS, is used to transmit and receive SSB and data, and radio frames, which are a 15 kHz SCS and a 60 kHz SCS, are used to transmit and receive data.

FIG. 5(B) is another configuration example of the SS burst set in slots when the subcarrier spacing of the radio signal to which the SS block is transmitted is 30 kHz. SSB #0 is allocated from symbol #2 to symbol #5, and SSB #1 is allocated from symbol #8 to symbol #11 in the slot. SSB #2 is allocated from symbol #2 to symbol #5, and SSB #3 is allocated from symbol #8 to symbol #11 in the subsequent slot. SSB #0 to SSB #3 are allocated in two consecutive slots. A radio frame, which is a 30 kHz SCS, is used to transmit and receive SSB and data, and radio frames, which are a 15 kHz SCS and a 60 kHz SCS, are used to transmit and receive data.

FIG. 5(C) illustrates an example of an SS burst set when the frequency band of the radio signal to which SS block is transmitted is from 0 Hz to 3 GHz in 5 ms slot units. Slots are defined as slot #0 to slot #9 in the order of time. As illustrated in FIG. 5C, SSB #0 and SSB #1 are allocated in the slot #0, and SSB #2 and SSB #3 are allocated in the slot #1.

FIG. 5(D) illustrates an example of an SS burst set when the frequency band of the radio signal to which the SS block is transmitted is from 3 GHz to 6 GHz in 5 ms slot units. Slots are defined as slot #0 to slot #9 in the order of time. As illustrated in FIG. 5(D), SSB #0 and SSB #1 are allocated in the slot #0, SSB #2 and SSB #3 are allocated in the slot #1, SSB #4 and SSB #5 are allocated in the slot #2, and SSB #6 and SSB #7 are allocated in the slot #3.

FIG. 6 is a diagram illustrating a configuration example (3) of an SS burst set according to an embodiment of the present invention. FIG. 6 illustrates an example of an SS burst set configured in units of 5 ms or 0.25 ms on a radio frame.

FIG. 6(A) is a configuration example of an SS burst set where the subcarrier spacing of the radio signal to which SS block is transmitted is 120 kHz and the frequency band is 52.6 GHz. The slots indicated in slot unit of 5 ms may be defined as slot #0 to slot #39 arranged in the order of time. SSB #32 is allocated from symbol #4 to symbol #7, and SSB #33 is allocated from symbol #8 to symbol #11 in slot #20. SSB #34 is allocated from symbol #2 to symbol #5, and SSB #35 is allocated from symbol #6 to symbol #9 in slot #22. With a similar slot configuration, SSB #0 to SSB #15 are allocated from slot #0 to slot #7, SSB #16 to SSB #31 are allocated from slot #10 to slot #17, SSB #32 to SSB #47 are allocated from slot #20 to slot #27, and SSB #48 to SSB #63 are allocated from slot #30 to slot #37. A radio frame that is 120 kHz SCS may be used to transmit and receive SSB and data, and a radio frame that is 60 kHz SCS may be used to transmit and receive data.

FIG. 6(B) is a configuration example of an SS burst set with a subcarrier spacing of 240 kHz and a frequency band from 6 GHz to 52.6 GHz for the radio signal to which SS block is transmitted. The slots indicated in slot unit of 5 ms are defined as slot #0 to slot #79 arranged in the order of time. Note that in FIG. 6(B), one cell corresponds to two slots. SSB #56 is allocated from symbol #8 to symbol #11 of slot #32, SSB #57 is allocated from symbol #12 of slot #32 to symbol #1 of slot #33, SSB #58 is allocated from symbol #2 to symbol #5 of slot #33, and SSB #59 is allocated from symbol #6 to symbol #9 of slot #33. SSB #60 is allocated from symbol #4 to symbol #7 of slot #34, SSB #61 is allocated from symbol #8 to symbol #11 of slot #34, SSB #62 is allocated from symbol #12 of slot #34 to symbol #1 of slot 35, and SSB #63 is allocated from symbol #2 to symbol #5 of slot 35. With a similar slot configuration, SSB #0 to SSB #31 are allocated from slot #0 to slot #15, and SSB #32 to SSB #63 are allocated from slot #20 to slot #35. A radio frame that is 240 kHz SCS may be used to transmit and receive SSB, and a radio frame that is 60 kHz SCS and 120 kHz SCS may be used to transmit and receive data.

Figure 7:
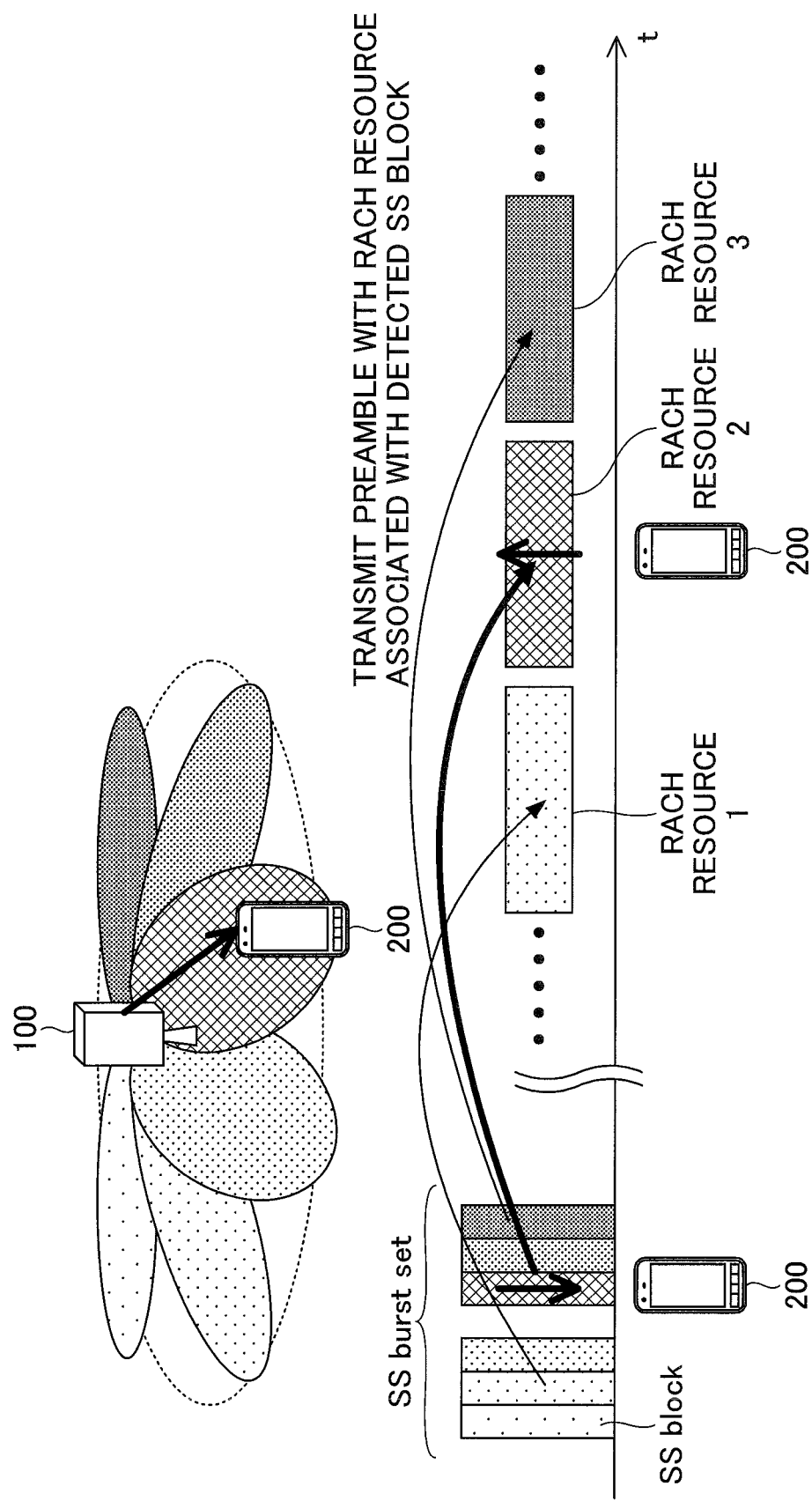
FIG. 7 is a diagram illustrating a RACH resource associated with an SS block according to an embodiment of the present invention.

FIG. 7 is a diagram illustrating a RACH resource associated with an SS block in an embodiment of the present invention. As illustrated in FIG. 7, in the NR, an SS burst set containing SS blocks associated with beams is transmitted from the base station 100. The user equipment 200 receives a detectable SS block and transmits a preamble with the RACH resource associated with the received SS block to initiate the initial access procedure. The RACH resources may each be associated with a beam.

In the example illustrated in FIG. 7, the user equipment 200 receives the fourth SS block contained in the SS burst set and transmits a preamble with the RACH resource 2 associated with the fourth SS block. In the example illustrated in FIG. 4, the second SS block in SS burst set is associated with RACH resource 1, and the sixth SS block in SS burst set is associated with RACH resource 3. The SS block also has a corresponding SS block index, the SS block index of the fourth SS block included in SS burst set is defined as "4".

That is, as illustrated in FIG. 7, each of SS blocks may be associated with a RACH resource or a preamble index. Further, one SS block may be associated with multiple RACH resources or preamble indices. Further, multiple RACH resources in the time direction, multiple RACH resources in the frequency direction, or a range of multiple preamble indices may be associated with each of SS blocks.

As with LTE, RACH configuration tables are defined, and an index that specifies each RACH configuration table is indicated from the base station 100 to the user equipment 200 for identify a location, a number, density, etc. in time domain of available RACH resources in NR. The association between each of the indicated available RACH resources with the SS block may be indicated from the base station 100 to the user equipment 200 or may be predefined.

Figure 8:
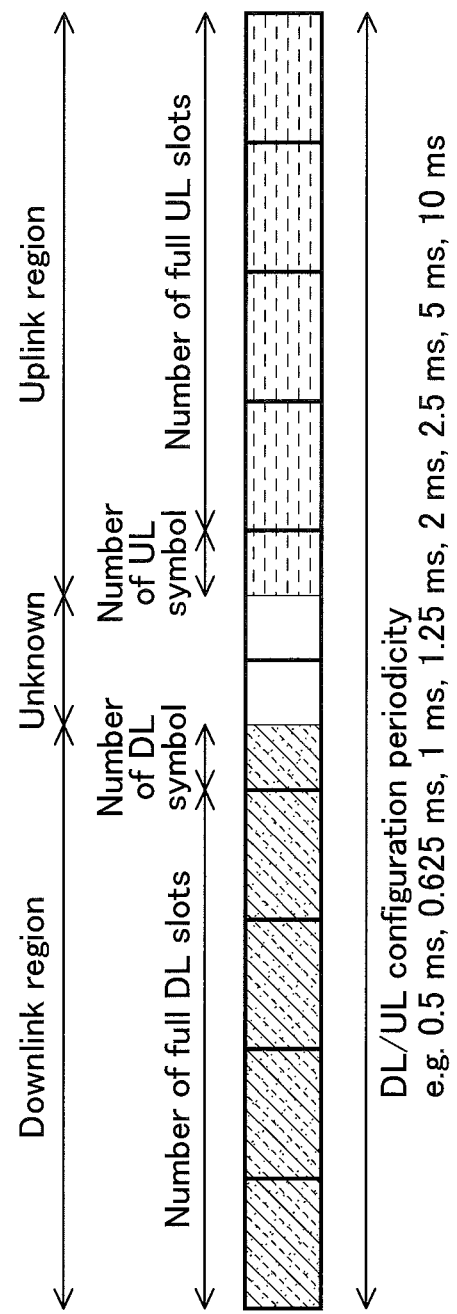
FIG. 8 is a diagram illustrating an example of a slot format according to an embodiment of the present invention.

FIG. 8 is a diagram illustrating an example of a slot format in an embodiment of the present invention. FIG. 8 depicts a DL/UL configuration having a format in which symbols or slots are defined as DL, UL, Unknown regions in a period of 10 slots. The period of the DL/UL configuration may be 0.5 ms, 0.625 ms, 1 ms, 1.25 ms, 2 ms, 2.5 ms, 5 ms, or 10 ms.

In order to indicate the format illustrated in FIG. 8, the following parameters may be indicated to the user equipment 200 from the base station 100.
1) Total number of slots: a total number of slots
2) Number of DL full DL slots: a total number of full DL slots to which only DL symbols are allocated
3) Number of DL symbols: the number of DL symbols in a certain slot (the fifth slot in FIG. 9)
4) Number of UL symbols: a certain slot (the number of UL symbols)
5) Number of full UL slots: a total number of full UL slots to which only UL symbols are allocated
Note that not all of the above parameters may be indicted to the user equipment 200, and some of the above parameters may be predefined.

Figure 9:
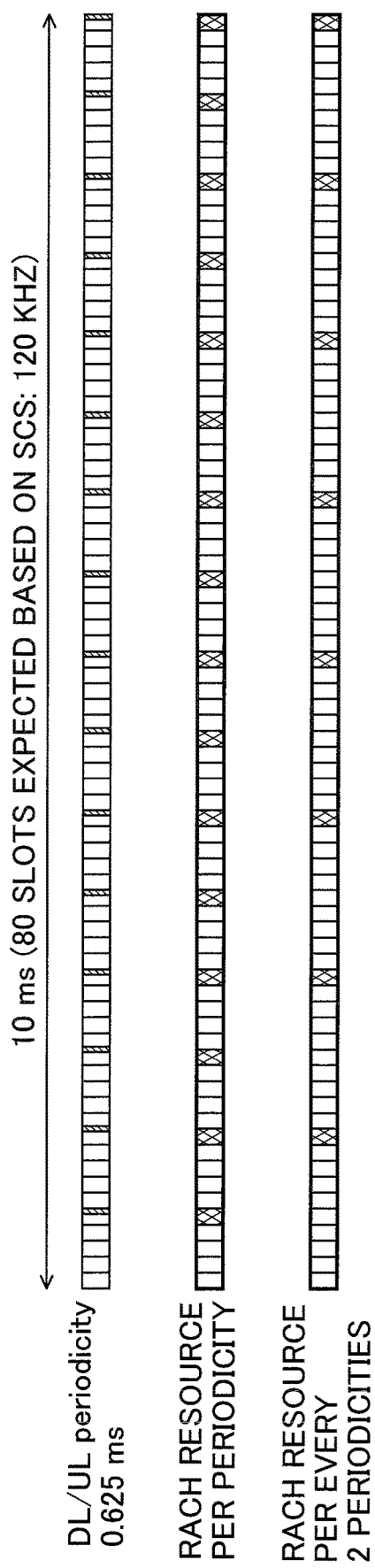
FIG. 9 is a diagram illustrating an example (1) of RACH resources according to the embodiment of the present invention.

Unlike the format described in FIG. 8, the number of slots to which only DL symbols are allocated, the number of DL symbols in slots to which only some DL symbols are allocated, the number of UL symbols in slots to which only some UL symbols are allocated, and the number of slots to which only UL symbols are allocated may be indicated to the user equipment 200 in FIG. 9. In FIG. 9, a total number of slots (10 slots in FIG. 9) representing a period during which the format is repeated may be indicated to the user equipment 200 or may be predetermined. The total number of slots may be indicated by a time length such as 0.5 ms, 1 ms, 2 ms, 5 ms, 10 ms, etc., as illustrated in FIG. 8, and may be indicated to the user equipment 200 or may be predefined. The location that is not designated to be used for DL or UL is "unknown". According to the format depicted in FIG. 8, first, full DL slots to which only DL symbols are allocated, next, slots containing "unknown", and finally, full UL slots to which only UL symbols are allocated are arranged in this order in time domain.

Here, when the base station 100 notifies the user equipment 200 of a RACH resource at the initial access in NR, the base station 100 needs to notify the user equipment 200 of an index of the RACH configuration table. Because the number of bits is limited in the broadcast information that is indicted inherent to cells, RACH resources may fail to be allocated flexibly with the number of indices included RACH configuration table.

In non-standalone environments, such as NR operation with LTE-NR dual connectivity, since an index of the RACH configuration table used in NR is individually indicated to the user equipment 200 using LTE RRC (Radio Resource Configuration) signaling over the network, and thus the number of bits may be less limited. Accordingly, to individually indicate an index of the RACH configuration table to the user equipment 200, the RACH configuration table used for broadcast information (60 kHz) may be defined as the RACH configuration table for an environment (dual connectivity, 120 kHz) that differs from the RACH configuration table used for broadcast information (60 kHz). In this case, because the RACH configuration table is defined as the RACH configuration table for non-standalone environment, the RACH resources may be set using the number of indices greater than the RACH configuration table used for broadcast information.

In addition, the RACH configuration table for non-standalone environment may include, or may not include, all or some of the RACH configuration tables for broadcast information.

Further, in a case where a RACH configuration table is defined as non-stand-alone environment, which differs from the RACH configuration table used for broadcast information, the base station 100 may indicate, to the user equipment 200, one-bit information for identifying whether to use the RACH configuration table used for broadcast information or the RACH configuration table for non-stand-alone environment, in addition to an index of the RACH configuration table.

Further, in non-stand-alone environment, while an index of the RACH configuration table used for broadcast information is notified by the RRC signaling, some of the parameters contained in the RACH configuration table may be further notified to the user equipment 200 by the RRC signaling, and only those parameters notified by the RRC signaling may be overridden among the parameters corresponding to the index of the RACH configuration table used for broadcast information. For example, the period (RACH config period) of the RACH resource allocation pattern specified in the RACH configuration table may be individually notified to the user equipment 200 by RRC signaling and overwritten.

In addition, an index of the RACH configuration table for the connected mode differing from the RACH configuration table for the broadcast information may be indicated to the user equipment 200 that has completed initial access and shifted in a connected mode by the RRC signaling. The index of RACH configuration table notified by the broadcast information is overwritten with the index of RACH configuration table notified by the RRC signaling. That is, a new RACH configuration table for the connected mode is defined. The new RACH configuration table for the connected mode may or may not include all or some of the RACH configuration tables notified by the broadcast information.

The new RACH configuration table may be identical to the RACH configuration table for non-standalone environment or may be different RACH configuration table.

In addition, when a RACH configuration table for a connected mode, differing from the RACH configuration table used for broadcast information, is defined, the base station 100 may indicate to the user equipment 200 one-bit information for identifying whether to use the RACH configuration table used for broadcast information or the RACH configuration table for the connected mode, in addition to the index of the RACH configuration table.

In addition, only some of the parameters contained in the RACH configuration table may be indicated to the user equipment 200 that has shifted in the connected mode, and only the indicated parameters may be overwritten among the parameter values corresponding to the index based on the RACH configuration table for the broadcast information. For example, a period (RACH config period) of a RACH resource allocation pattern specified in the RACH configuration table may be individually indicated to the user equipment 200 by RRC signaling and overwritten.

FIG. 9 is a diagram illustrating an example (1) of the allocation of RACH resources according to an embodiment of the present invention. As RACH resources in the time domain allocated by the index of the RACH configuration table, RACH resources may be allocated in one or more slots at the end of each period of the DL/UL configuration that can be notified. The illustrated radio frame corresponds to 10 ms, and the expected SCS (Subcarrier spacing) is 120 kHz, where one slot has a length of 0.125 ms. With reference to "DL/UL configuration of 0.625 ms" in FIG. 9, a resource allocated to a slot at the end of each period of the DL/UL configuration of 0.625 ms is indicated by shading; that is, a RACH resource allocated at every 5 slots is indicated by shading.

Further, with respect to "RACH resource per Periodicity" in FIG. 9, a RACH resource allocated to a slot at the end of each period of the DL/UL configuration is indicated by shading; that is, a RACH resource allocated at every 5 slots is indicated by shading. Further, with reference to "RACH resource per every 2 Periodicities" in FIG. 9, a RACH resource allocated to a slot at the end of every two periods of the DL/UL configuration is indicated by shading; that is, a RACH resource allocated at every 10 slots is indicated by shading. Similarly, a RACH resource may be allocated at every integral multiple period of DL/UL configuration.

The period (RACH configuration period) of the RACH resource allocation pattern specified in the RACH configuration table may be 10 ms, 20 ms, 40 ms, 80 ms, 160 ms, or the like. For example, when the RACH resource allocation pattern has a period of 40 ms, the RACH resource may be allocated only for a period of 10 ms out of 40 ms, and the RACH resource may not be allocated for the other 30 ms.

Figure 10:
FIG. 10 is a diagram illustrating an example (2) of RACH resources according to the embodiment of the present invention.

FIG. 10 is a diagram illustrating an example (2) of the allocation of RACH resources according to an embodiment of the present invention. To specify a first (former) slot or second (latter) slot with respect to multiple slots (e.g., as two slots) for RACH resource allocation in the RACH configuration table, it is possible to dynamically change first (former) slot or second (latter) slot to be specified for each period of the RACH resource allocation pattern specified in the RACH configuration table.

In FIG. 10, the illustrated radio frame is 10 ms, and the SCS indicates 80 slots expected based on 120 kHz. For example, a slot index is notified by referring to 40 slots of the 60 kHz SCS corresponding to an index of the RACH configuration table. Of the two slots of 120 KHz SCS corresponding to one slot of notified 60 kHz SCS, whether to use both slots, or the second (latter) slot with respect to RACH resources may be specified by the slot index. That is, the slot index may be specified by SCS that is smaller than the SCS of the RACH resources.

Note that as illustrated in FIG. 10, when the DL/UL configuration period is 0.625 ms, then RACH resources cannot be allocated using the latter slot alone at the end of the period. For example, the fifth slot from the first slot of FIG. 10 (i.e., 120 kHz SCS) corresponds to the first half (the former half slot) of one slot in a 60 kHz SCS (subcarrier spacing). The RACH resource may be specified by the index of the RACH configuration table (of 60 kHz SCS) to alternately use the first (former) slot and or the second (latter) slot of the two slots of a 120 kHz SCS, which corresponds to one slot of 60 kHz SCS. As described above, allocation to the second (latter) slot, to both slots, or alternately to the first and second slots, may be dynamically changeable on a per-slot basis or periodically for the RACH resource allocation pattern.

Further, as allocation of other RACH resources, only a subset of the slots in which RACH resources are allocated, e.g., as specified in the radio frame 10 ms, may be used as RACH resources, while only a subset of the slots in which the latter slots are used as RACH resources, and other slots in which both the first (former) and second (latter) slots may be used as RACH resources. Multiple slots to which RACH resources are to be allocated may be specified by a slot index of smaller SCS 60 kHz, and the first (former) and second (latter) slots may be defined in a radio frame of a (SCS 120 kH) greater than the SCS 60 kHz the slot index of which is notified to user equipment 200. The above RACH resource allocation allows RACH resources to be allocated to successive slots such as the first and second slots, and allows RACH resources to be allocated to odd slot numbers in a radio frame of an SCS 120 kHz.

It is assumed that the SS burst set position in the radio frame 10 ms is located at the first 5 ms in the 10 ms range, and the SS burst set is not located in the latter 5 ms, except when the SS burst set periodicity is 5 ms. Accordingly, RACH resources may be allocated only for the first 5 ms period of 10 ms, and RACH resources may be allocated to a slot next to the slot to which SS burst set is allocated, according to the location of SS burst set. In addition, among the slots in which SS burst set is allocated, the RACH resource may be allocated at a position where SS block is not actually sent.

In addition, RACH resources may be allocated only for the latter 5 ms period of 10 ms. This allocation allows the allocation of RACH resources without constraints on the allocation of SS burst sets, and also enhances the flexibility of the allocation of other channels.

Here, the RACH resource allocation in 10 ms is specified by the index in the RACH configuration table. Meanwhile, the period of the RACH resource allocation pattern may be 10 ms, 20 ms, 40 ms, 80 ms, and 160 ms. That is, in a 10 ms period next to the 10 ms period in which the RACH resource is allocated, when the RACH resource allocation pattern periodicity is 10 ms, RACH is constantly allocated, and when the RACH resource allocation pattern periodicity is 20 ms, RACH is not allocated.

To specify the first slot or the second slot as allocation by the RACH configuration table, a starting symbol index indicating a symbol to start the RACH resource allocation in one slot may be read as a different value according to the SCS of the PRACH corresponding to the RACH resource. For example, as a certain index of a RACH configuration table, the latter slot of the two slots of SCS 120 kHz is specified with respect to a RACH resource. If the SCS of PRACH is 120 kHz, the starting symbol index may be 0 or 2, and if the SCS of PRACH is 60 kHz, the starting symbol index may be 7, 8 or 9. Similarly, if the SCS of PRACH is 30 kHz, the starting symbol index may be 0 or 2, and if the SCS of PRACH is 15 kHz, the starting symbol index may be 7, 8 or 9.

In the above example, if the SCS of PRACH is 60 kHz or 15 kHz, a starting symbol may be specified based on assumption of a half-slot of a latter part in one slot. That is, the RACH resource may be allocated with a symbol at a position in time domain similar to the slot position of the SCS of PRACH is 120 kHz or 30 kHz. A position of a starting symbol may be specified to be the same for each SCS in time domain, or a position of a starting symbol may be specified to be different for each SCS in time domain.

Since a starting symbol in one slot is also relating to the length of time per PRACH format, different values may be specified for each PRACH format or for each index of the RACH configuration table. According to the time length of the starting symbol and the PRACH format, a different value may be set for an ending symbol, which indicates a symbol of ending the RACH resource allocation in one slot.

Note that starting symbol to be practically used in each SCS is set for each index of the RACH configuration table. A method of specifying a starting symbol may be reading an index as a different value in accordance with the above-mentioned SCS or may be specified separately in the RACH configuration table for each SCS.

Further, when RACH resources are allocated in successive slots, the starting symbol may be applied in first one slot only. For example, when RACH resources are allocated to successive slots in all one period of DL/UL configuration, DL may be only in the first slot. For example, by setting starting symbol to 2, downstream control information can be allocated to 0 symbol and 1 symbol in the first slot.

In addition, the RACH configuration table differs between FDD and TDD as the RACH configuration table. The user equipment 200 may determine as follows whether the RACH configuration table corresponds to an FDD or a TDD.
1) When FDD or TDD is specified for each band, the corresponding band FDD or TDD are determined according to the located band of the user equipment 200.
2) When the content notified by the broadcast information is different according to the FDD or the TDD, the FDD or the TDD is implicitly determined according to the content.
The above determination may be applied to the determination of the corresponding duplicate communication method by RACH configuration table, or other tables or parameters may be applied to the determination of the corresponding duplicate communication method.

In the above-described embodiment, the user equipment 200 may use a plurality of RACH configuration tables and identify the RACH resources allocated based on an index relating to the RACH configuration table notified by the base station 100. According to the period of DL/UL configuration and the allocation of SCS and SS blocks in the RACH resources, it is possible to efficiently notify the slots in which the RACH resource is located.

That is, at the initial access of the radio communication system, the available resources can be efficiently notified to the user equipment.

(Device Configuration)

Next, a functional configuration example of the base station 100 and the user equipment 200 that execute the process and operation described above will be described. Each of the base station 100 and the user equipment 200 includes a function to implement at least an embodiment. However, each of the base station 100 and the user equipment 200 may include only some of the functions in the embodiments.

Figure 11:
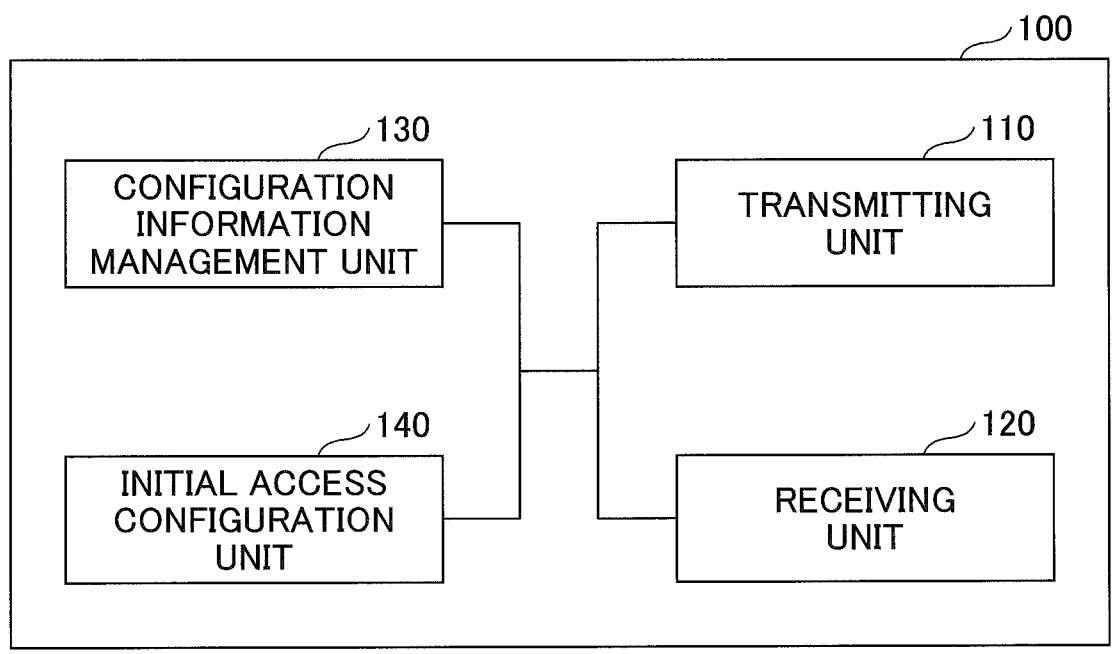
FIG. 11 is a diagram illustrating a functional configuration example of a base station according to the embodiment of the present invention.

FIG. 11 is a diagram illustrating an example of a functional configuration of a base station 100. As illustrated in FIG. 11, the base station 100 includes a transmitting unit 110, a receiving unit 120, a configuration information management unit 130, and an initial access configuration unit 140. The functional configuration illustrated in FIG. 11 is only one example. If the operation according to an embodiment of the present invention can be performed, the name of the functional category and the functional part may be any one.

The transmitting unit 110 includes a function of generating a signal to be transmitted to the user equipment 200 and transmitting the signal wirelessly. The receiving unit 120 includes a function of receiving various signals transmitted from the user equipment 200 and acquiring information of a higher layer, for example, from the received signal. The transmitting unit 110 has a function of transmitting NR-PSS, NR-SSS, NR-PBCH, DL/UL control signals, etc. to the user equipment 200. The transmitting unit 110 transmits information relating to the transmit power control and information relating to scheduling to the user equipment 200, and the receiving unit 120 receives a message relating to the preamble and the initial access from the user equipment 200.

The configuration information management unit 130 stores the preset setting information and various setting information transmitted to the user equipment 200. The content of the setting information is, for example, information used for initial access.

The initial access configuration unit 140 controls the transmission of system information including synchronization signals and information used for initial access to the user equipment 200 in the base station 100, the setting of the RACH resource, and the initial access from the user equipment 200 as described in the embodiment.

Figure 12:
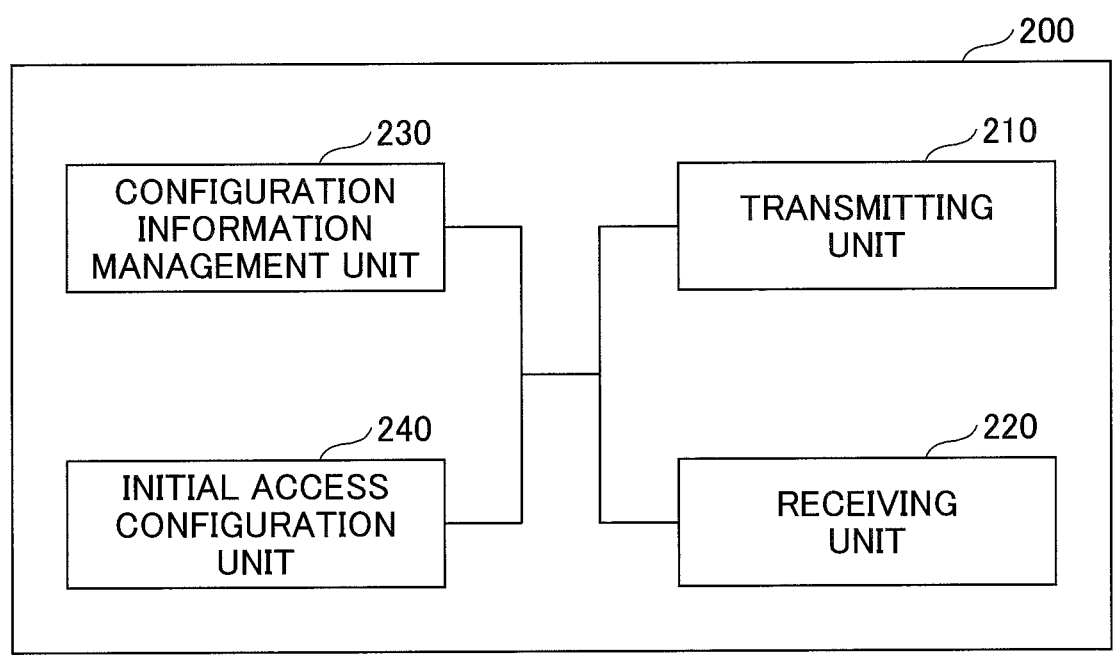
FIG. 12 is a diagram illustrating a functional configuration example of user equipment 200 according to an embodiment of the present invention.

FIG. 12 is a diagram illustrating an example of a functional configuration of user equipment 200. As illustrated in FIG. 12, the user equipment 200 includes a transmitting unit 210, a receiving unit 220, a configuration information management unit 230, and an initial access control unit 240. The functional configuration illustrated in FIG. 12 is only one example. If the operation according to an embodiment of the present invention can be performed, the name of the functional category and the functional part may be any one.

The transmitting unit 210 generates a transmit signal from the transmit data and transmits the transmit signal wirelessly. The receiving unit 220 receives a variety of signals wirelessly and acquires a higher layer signal from the received physical layer signal. The receiving unit 220 has a function to receive NR-PSS, NR-SS, NR-PBCH, DL/UL control signals, etc. transmitted from the base station 100. The transmitting unit 210 transmits a message relating to the preamble and the initial access to the base station 100, and the receiving unit 120 receives information used for the initial access from the base station 100.

The configuration information management unit 230 stores various setting information received from the base station 100 by the receiving unit 220. The configuration information management unit 230 also stores the setting information preset in advance. The content of the setting information is, for example, information used for initial access.

The initial access control unit 240 controls the selection and initial access of the RACH resource in the user equipment 200 as described in the embodiment. The transmitting unit 210 may include a function unit related to the preamble signal transmission, etc. in the initial access control unit 240, and the receiving unit 220 may include a function unit related to the system information reception, etc. in the initial access control unit 240.

(Hardware Configuration)

The functional configuration diagrams (FIGS. 11 and 12) used in the description of the above-described embodiments of the present invention illustrate blocks of functional units. These functional blocks (components) are implemented by any combination of hardware and/or software. Further, the means for implementing each functional block is not particularly limited. That is, each functional block may be implemented by one device with a physical and/or logical combination of elements, or two or more devices that are physically and/or logically separated may be connected directly and/or indirectly (e.g., wired and/or wireless) and implemented by a plurality of these devices.

Figure 13:
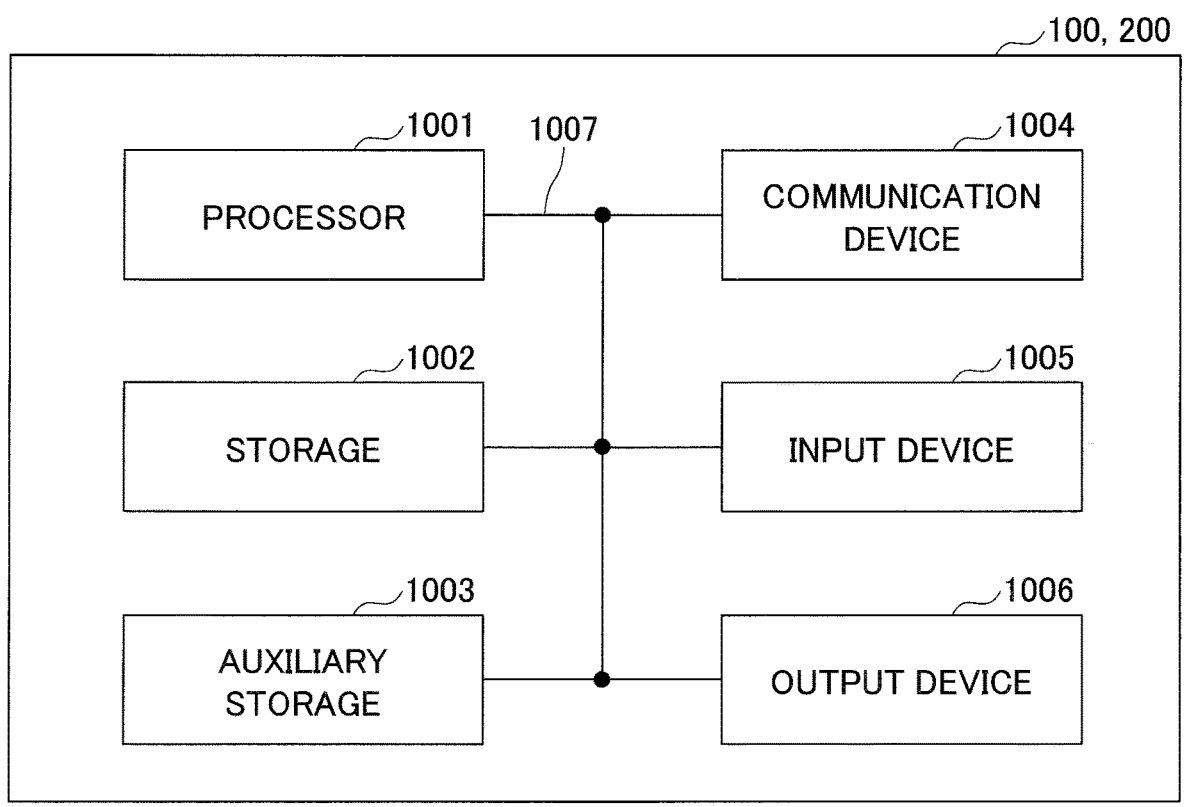
FIG. 13 is a diagram illustrating an example of a hardware configuration of a base station 100 or user equipment 200.

For example, both the base station 100 and the user equipment 200 in one embodiment of the present invention may function as a computer performing processing according to embodiments of the present invention. FIG. 13 is a diagram illustrating an example of a hardware configuration of a radio communication device that is a base station 100 or user equipment 200 according to an embodiment of the present invention. Each of the aforementioned base stations 100 and user equipment 200 may be physically configured as a computer device including a processor 1001, a storage 1002, an auxiliary storage 1003, a communication device 1004, an input device 1005, an output device 1006, a bus 1007, and the like.

In the following description, the term "device" can be read as a circuit, device, unit, etc. The hardware configuration of the base station 100 and the user equipment 200 may be configured to include one or more of the respective devices illustrated with reference to 1001 to 1006 in FIG. 27 or may be configured without including some of the devices.

The functions of the base station 100 are implemented by allowing predetermined software (programs) to be loaded on the hardware such as the processor 1001, the storage 1002, and the like, so as to cause the processor 1001 to perform calculations to control communications by the communication device 1004, and reading and/or writing of data in the storage 1002 and the auxiliary storage 1003.

A processor 1001, for example, operates an operating system to control the entire computer. The processor 1001 may include a central processing unit (CPU) including interfaces with peripheral devices, controls, computing devices, registers, and the like.

The processor 1001 also reads programs (program code), software modules or data from the auxiliary storage 1003 and/or the communication device 1004 into the storage 1002 and performs various processing in accordance therewith. As a program, a program that causes a computer to execute at least a portion of the operation described in the above-described embodiment is used. For example, the transmitting unit 110, the receiving unit 120, the configuration information management unit 130, and the initial access configuration unit 140 of the base station 100 illustrated in FIG. 11 may be stored in the storage 1002 and implemented by a control program operating in the processor 1001. For example, the transmitting unit 210 of the user equipment 200 illustrated in FIG. 12, the receiving unit 220, the configuration information management unit 230, and the initial access control unit 240 may be stored in the storage 1002 and implemented by a control program operating in the processor 1001. While the various processes described above have been described as being executed in one processor 1001, they may be executed simultaneously or sequentially by two or more processors 1001. Processor 1001 may be implemented in one or more chips. The program may be transmitted from the network via a telecommunications line.

Storage 1002 is a computer readable storage medium and may be comprised of at least one such as, for example, ROM (Read Only Memory), EPROM (Erasable Programmable ROM), EEPROM (Electrically Erasable Programmable ROM), RAM (Random Access Memory). The storage 1002 may be referred to as a register, cache, main memory (main storage), or the like. The storage 1002 may store programs (program code), software modules, and the like executable to perform the processing according to one embodiment of the present invention.

The auxiliary storage 1003 is a computer readable storage medium and may comprise, for example, at least one of an optical disk, such as a CD-ROM (Compact Disc ROM), a hard disk drive, a flexible disk, an optical magnetic disk (e.g., a compact disk, a digital versatile disk, a Blu-ray™ disk, a smart card, a flash memory (e.g., a card, a stick, a key drive), a Floppy™ disk, a magnetic strip, and the like. The auxiliary storage 1003 may be referred to as an auxiliary storage. The storage medium described above may be, for example, a database, a server, or other suitable medium including a storage 1002 and/or an auxiliary storage 1003.

The communication device 1004 is a hardware (transceiver device) for communicating between computers over a wired and/or wireless network, and is also referred to, for example, as a network device, a network controller, a network card, a communication module, and the like. For example, the transmitting unit 110 and the receiving unit 120 of the base station 100 may be implemented in the communication device 1004. The transmitting unit 210 and the receiving unit 220 of the user equipment 200 may be implemented in the communication device 1004.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs outgoing output. The input device 1005 and the output device 1006 may be of an integrated configuration (e.g., a touch panel). The input device 1005 and the output device 1006 may be of an integrated configuration (e.g., a touch panel).

Each device, such as processor 1001 and storage 1002, is also connected by a bus 1007 for communicating information. The bus 1007 may be comprised of a single bus or may be comprised of different buses between devices.

In addition, the base station 100 and the user equipment 200 may each include hardware such as a microprocessor, a digital signal processor (DSP), an ASIC (Application Specific Integrated Circuit), a PLD (Programmable Logic Device), and a FPGA (Field Programmable Gate Array), wherein the hardware may implement some or all of the functional blocks. For example, processor 1001 may be implemented in at least one of the hardware.

Summary of Embodiments

According to the embodiments described above, user equipment for communicating with a base station via a radio frame is disclosed. The user equipment includes a receiver configured to receive an index relating to a RACH configuration table indicating allocation of RACH resources in the radio frame from the base station;

a controller configured to identify available RACH resources based on a plurality of different RACH configuration tables and the indices; and a transmitter configured to transmit a preamble to the base station using the identified available RACH resource.

The above configuration allows the base station 100 to allocate RACH resources using multiple RACH configuration tables according to the communication situation, and allow the user equipment 200 to identify RACH resources. Accordingly, in the initial access of the radio communication system, the available resources can be efficiently notified to the user equipment.

The plurality of different RACH configuration tables may include

RACH configuration tables used in the broadcast information and RACH configuration tables used in non-standalone, RACH configuration tables used in the broadcast information and RACH configuration tables used in the connected mode, or RACH configuration table used in the broadcast information, and the RACH configuration table used in the broadcast information some parameters of which have been rewritten by RRC signaling. The configuration allows the user equipment to identify available RACH resources based on multiple RACH configuration tables according to the communication situation.

The RACH configuration table may include a setting in which RACH resources are allocated in one or more slots at an end of the integer multiple period for each integral multiple of a period of information indicative of downlink allocation or uplink allocation. With this configuration, the user equipment 200 can identify RACH resources, according to the DL/UL configuration.

The RACH configuration table may include a setting of specifying one or more slots based on subcarrier intervals less than the subcarrier intervals of the RACH resource allocation pattern for each period of the RACH resource allocation pattern, and specifying whether RACH resources are allocated in first and second slots, respectively, of a plurality of slots at the corresponding subcarrier intervals of the RACH resource in time domain in the specified one or more slots. The configuration allows the user equipment 200 to identify RACH resources by a slot index according to the SCS.

The RACH configuration table may include a setting of specifying an index indicating a symbol at which allocation of the RACH resource in the slot starts, based on the subcarrier interval of the RACH resource. The configuration allows the user equipment 200 to identify RACH resources by a starting index according to the SCS.

According to the embodiment described above, a base station for communicating with user equipment via a radio frame is disclosed. The base station includes a transmitter configured to transmit an index relating to a RACH configuration table indicating allocation of RACH resources in the radio frame to the user equipment;

a setting unit configured to identify available RACH resources based on a plurality of different RACH configuration tables and the index; and a receiver configured to receive a preamble from the base station using the identified available RACH resource.

The above configuration allows the base station 100 to allocate RACH resources using multiple RACH configuration tables according to the communication situation, and allow the user equipment 200 to identify RACH resources. Accordingly, in the initial access of the radio communication system, the available resources can be efficiently notified to the user equipment.

Supplementary Description of Embodiments

While embodiments of the present invention have been described above, the disclosed invention is not limited to such embodiments, and those skilled in the art will understand various modifications, modifications, alternatives, substitutions, and the like. Descriptions have been made using specific numerical examples to facilitate understanding of the invention, but, unless otherwise indicated, these values are merely examples and any suitable value may be used.

In the above description, partitioning of items is not essential to the present invention. Matters described in two or more items may be combined if necessary. Matters described in one item may be applied to matters described in another item (as long as they do not conflict).

The boundaries of functional parts or processing parts in the functional block diagram do not necessarily correspond to the boundaries of physical parts. Operations of multiple functional units may be physically performed in a single part, or operations of a single functional unit may be physically performed by multiple parts. The order of steps in the above described operating procedures according to an embodiment may be changed as long as there is no contradiction. For convenience of the process description, the base station 100 and the user equipment 200 have been described using functional block diagrams, but such devices may be implemented in hardware, software, or a combination thereof. Software operated by the processor in accordance with embodiments of the present invention and software operated by the processor in accordance with embodiments of the present invention may be stored in random access memory (RAM), flash memory (RAM), read-only memory (ROM), EPROM, EEPROM, registers, hard disks (HDD), removable disks, CD-ROM, databases, servers, or any other suitable storage medium, respectively.

Notification of information is not limited to the embodiments/embodiments described herein, but may be performed in other ways. For example, reporting of information may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block) and SIB (System Information Block)))), and other signals or a combination thereof. Further, RRC signaling may be referred to as an RRC message, and may be an RRC connection setup (RRCC connection setup) message, an RRC connection reconfiguration (RRCC connection registration) message, or the like.

Each aspect/embodiment described herein may be applied to LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-Wide Band), Bluetooth (registered trademark), and a system that utilize other suitable systems and/or a next generation system expanded based on such a system.

The order of processes, sequences, flowcharts, etc. of each aspect/embodiment described in the present specification may be exchanged as long as there is no inconsistency. For example, for the methods described in the specification, the elements of the various steps are presented in an exemplary order and are not limited to a specific order presented.

The particular operation described herein to be performed by base station 100 may be performed by an upper node in some cases. It is apparent that in a network consisting of one or more network nodes having base station 100, various operations performed for communication with user equipment 200 may be performed by base station 100 and/or other network nodes other than base station 100 (e.g., but not limited to MME or S-GW). While exemplifying one other network node other than the base station 100 as described above, it may be a combination of multiple other network nodes (e.g., MME and S-GW).

Aspects/embodiments described in this specification may be used alone or in combination, or may be switched in accordance with execution.

The user equipment 200 may be referred to by one of ordinary skill in the art as a subscriber station, a mobile unit, a subscriber unit, a wireless unit, a remote unit, a mobile unit, a wireless device, a wireless device, a wireless device, a remote device, a mobile subscriber station, an access terminal, a wireless terminal, a remote terminal, a remote terminal, a handset, a user agent, a mobile client, or some other suitable term.

The base station 100 may be referred to by one of ordinary skill in the art as NB (NodeB), eNB (enhanced NodeB), gNB, base station, or some other suitable term.

As used herein, the terms "determining" and "deciding" may encompass a wide variety of actions. The terms "determining" and "deciding" may be deemed to include, for example, judging, calculating, computing, processing, deriving, investigating, looking up (e.g., searching tables, databases or other data structures), and ascertaining. Further, the terms "determining" and "deciding" may be deemed to include, for example, receiving (e.g., receiving information), transmitting (e.g., transmitting information), input, output, and accessing (e.g., accessing data in memory). Moreover, the terms "determining" and "deciding", may be deemed to include, for example, resolving, selecting, choosing, establishing, and comparing (comparing). Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

As long as "include", "including", and variations thereof are used in the specification or claims, these terms are intended to be inclusive in a manner similar to the term "comprising". Furthermore, the term "or" used in the specification or claims is intended to be not an exclusive "or".

In the entirety of the present disclosure, articles, such as "a", "an", or "the" in English that are added to a noun term by translation may indicate a plurality of the noun terms unless the articles obviously indicate a singular noun from the context.

In an embodiment of the present invention, SS block is an example of SS block. The initial access configuration unit 140 is an example of a setting unit. The initial access control unit 240 is an example of a control unit. RACH configuration table is an example of a RACH configuration table. The index in the RACH configuration table is an example of an index. DL/UL configuration is an example of information indicating downlink layout or uplink allocation.

While the invention has been described in detail, it will be apparent to those skilled in the art that the invention is not limited to the embodiments described herein. The invention can be implemented as modifications and modifications without departing from the spirit and scope of the invention as defined by the appended claims. Accordingly, the description herein is intended for illustrative purposes and does not have any limiting significance to the present invention.

DESCRIPTION OF REFERENCE SIGNS

100 base station
200 user equipment
110 transmitting unit
120 receiving unit
130 configuration information management unit
140 initial access configuration unit
200 user equipment
210 transmitting unit
220 receiving unit
230 configuration information management unit
240 initial access control unit
1001 processor
1002 storage
1003 auxiliary storage
1004 communication device
1005 input device
1006 output device

The invention claimed is:

1. A terminal comprising:
   a receiver that receives an index specifying a configuration of a Random Access CHannel (RACH) resource in a radio frame;
   a processor that identifies the RACH resource based on the index; and
   a transmitter that transmits a random access preamble using the RACH resource,
   wherein the configuration of the RACH resource includes a time domain location and a number of the RACH resource specified by the index, and
   wherein the configuration of the RACH resource includes a configuration such that the RACH resource is allocated only in a latter half of the radio frame per period, the period being twice duration of the radio frame.

2. The terminal according to claim 1,
   wherein the receiver receives an index specifying a configuration of the RACH resource in a connected mode using RRC signaling after receiving the index specifying the configuration of the RACH resource using system information, and
   wherein the processor identifies a RACH resource based on the index specifying the configuration of the RACH resource in the connected mode.

3. The terminal according to claim 1,
   wherein the configuration of the RACH resource includes a configuration in which the RACH resource is allocated in a last slot in the period.

4. A communication method of a terminal comprising:
receiving an index specifying a configuration of a Random Access CHannel (RACH) resource in a radio frame;
identifying a RACH resource based on the index; and
transmitting a random access preamble using the RACH resource,
wherein the configuration of the RACH resource includes a time domain location and a number of the RACH resource specified by the index, and
wherein the configuration of the RACH resource includes a configuration such that the RACH resource is allocated only in a latter half of the radio frame per period, the period being twice duration of the radio frame.

5. A base station comprising:
a transmitter that transmits an index specifying a configuration of a Random Access CHannel (RACH) resource in a radio frame;
a processor that identifies a RACH resource based on the index; and
a receiver that receives a random access preamble using the RACH resource,
wherein the configuration of the RACH resource includes a time domain location and a number of the RACH resource specified by the index, and
wherein the configuration of the RACH resource includes a configuration such that the RACH resource is allocated only in a latter half of the radio frame per period, the period being twice duration of the radio frame.

* * * * *